United States Patent
Conlon

(10) Patent No.: US 10,113,535 B2
(45) Date of Patent: *Oct. 30, 2018

(54) DISPATCHABLE COMBINED CYCLE POWER PLANT

(71) Applicant: William M. Conlon, Palo Alto, CA (US)

(72) Inventor: William M. Conlon, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,975

(22) Filed: Oct. 13, 2017

(65) Prior Publication Data

US 2018/0038352 A1 Feb. 8, 2018

Related U.S. Application Data

(63) Continuation of application No. 14/722,945, filed on May 27, 2015, now Pat. No. 9,816,490.
(Continued)

(51) Int. Cl.
*F03G 6/00* (2006.01)
*F01K 3/02* (2006.01)
(Continued)

(52) U.S. Cl.
CPC ............... *F03G 6/005* (2013.01); *F01K 3/02* (2013.01); *F01K 3/18* (2013.01); *F01K 7/16* (2013.01);
(Continued)

(58) Field of Classification Search
CPC . F03G 6/005; F02C 6/14; F01K 23/10; F01K 23/18; F01K 7/16; F01K 3/02; F05D 2220/72; F05D 2220/32
(Continued)

(56) References Cited

U.S. PATENT DOCUMENTS 5,444,972 A * 8/1995 Moore ............ F02C 1/05
60/39.182
5,887,418 A * 3/1999 Bruckner ......... F01K 23/103
60/39.182

(Continued)

OTHER PUBLICATIONS

Turchi et al., "Gas Turbine/Solar Parabolic Trough Hybrid Designs", Conference Paper NREL/CP-5500-50586, Mar. 2011, 11 pages.
(Continued)

*Primary Examiner* — Christopher Demeree
(74) *Attorney, Agent, or Firm* — Innovation Counsel LLP

(57) ABSTRACT

A combined cycle power plant comprises a combustion turbine generator, another heat source in addition to the combustion turbine generator, a steam power system, and an energy storage system. Heat from the heat source, from the energy storage system, or from the heat source and the energy storage system is used to generate steam in the steam power system. Heat from the combustion turbine generator exhaust gas may be used primarily for single phase heating of water or steam in the steam power system. Alternatively, heat from the combustion turbine generator exhaust gas may be used in parallel with the energy storage system and/or the other heat source to generate steam, and additionally to super heat steam. Both the combustion turbine generator and the steam power system may generate electricity.

18 Claims, 3 Drawing Sheets

Related U.S. Application Data

(60) Provisional application No. 62/007,529, filed on Jun. 4, 2014.

(51) Int. Cl.
*F01K 23/10* (2006.01)
*F01K 23/18* (2006.01)
*F02C 6/14* (2006.01)
*F01K 7/16* (2006.01)
*F01K 3/18* (2006.01)
*F22B 1/00* (2006.01)

(52) U.S. Cl.
CPC .............. *F01K 23/10* (2013.01); *F01K 23/18* (2013.01); *F02C 6/14* (2013.01); *F22B 1/006* (2013.01); *F05D 2220/32* (2013.01); *F05D 2220/72* (2013.01); *Y02E 10/46* (2013.01); *Y02E 20/16* (2013.01)

(58) Field of Classification Search
USPC ...................................................... 60/39.182
See application file for complete search history.

(56) References Cited

U.S. PATENT DOCUMENTS

| | | | |
|---|---|---|---|
| 6,941,759 B2 | 9/2005 | Bellac et al. | |
| 8,286,429 B2 | 10/2012 | Heide et al. | |
| 8,701,411 B2 | 4/2014 | Koketsu | |
| 2007/0012041 A1* | 1/2007 | Goldman | F01K 13/00 60/641.8 |
| 2007/0157614 A1 | 7/2007 | Goldman | |
| 2008/0127647 A1 | 6/2008 | Leitner | |
| 2009/0229264 A1 | 9/2009 | Gilon | |
| 2010/0175365 A1 | 7/2010 | Ota | |
| 2011/0126824 A1 | 6/2011 | Conlon et al. | |
| 2011/0127773 A1 | 6/2011 | Freund et al. | |
| 2011/0137480 A1 | 6/2011 | Sampson et al. | |
| 2012/0000202 A1 | 1/2012 | Menendez Salcedo et al. | |
| 2012/0102950 A1 | 5/2012 | Turchi | |
| 2012/0167873 A1 | 7/2012 | Venetos et al. | |
| 2012/0255309 A1 | 10/2012 | Venetos et al. | |
| 2013/0152586 A1 | 6/2013 | Mishima et al. | |
| 2014/0033676 A1 | 2/2014 | Pang et al. | |
| 2014/0060046 A1 | 3/2014 | Takahashi et al. | |

OTHER PUBLICATIONS

Document of The World Bank, Report No: ICR2693; "Implementation Completion and Results Report (TF-58314) on a Grant in the Amount of US$ 43.2 Million from the Global Environment Facility Trust Fund to the Office National De L'Electricite et de L'Eau Potable (Onee) of the Kingdom of Morocco for an Integrated Solar Combined Cycle Power Project", Jun. 25, 2013, 67 pages.

International Search Report, corresponding to PCT/US15/32643, dated Oct. 6, 2015, 4 pages.

Alqahtani, "Integrated Solar Combined Cycle Power Plants: Paving the Way for Thermal Solar", Thesis, Department of Environment Duke University, 2015, 71 pages.

Supplementary European Search Report, EP15803786, dated Mar. 21, 2018, 1 page.

* cited by examiner

DISPATCHABLE COMBINED CYCLE POWER PLANT

CROSS REFERENCE TO RELATED APPLICATIONS

This application is a continuation of U.S. patent application Ser. No. 14/722,945 titled "Dispatchable Solar Hybrid Power Plant" and filed May 27, 2015, which claims benefit of priority to U.S. Provisional Patent Application No. 62/007,529 titled "Dispatchable Solar Hybrid Power Plant" and filed Jun. 4, 2014, each of which is incorporated herein by reference in its entirety.

FIELD OF THE INVENTION

The invention relates generally to solar hybrid power plants that may use solar power and fossil fuels to generate electricity.

BACKGROUND

Electricity is a 'just-in-time' commodity, necessitating that supply and demand of power be balanced in order to maintain specified frequency and voltage. The electric demand or load varies based on the needs of connected industrial, commercial, or residential customers for lighting, HVAC, electronics and appliances, pumps and motors, etc. Electricity demand displays patterns that are influenced by the level of macro-economic activity, weather, customary working hours, time-of-day, as well as many other factors.

Electric generation must supply the demand, generally in the most economic manner, given constraints on fuel cost/availability, power plant operating/maintenance condition, availability of cooling for heat engines, and transmission costs or capacity constraints. Generating units are generally dispatched in merit order, based on the marginal cost of generation, with the most economical operated the most and supplying the 'base load.' In addition to the marginal cost of operation, which is proportional to the cost of fuel and other variable costs such as an overhaul accrual, generating units also have startup cost for fuel and wear-and-tear to bring them from a cold condition to an operating condition. Accordingly, some generating units may be placed in a 'hot standby' condition, if the standby operating costs are less than the startup costs, and the unit is required to meet anticipated demand or reserve margins.

The marginal operating cost will determine when a generating unit is dispatched and how many megawatt-hours it will produce. In a regulated integrated utility responsible for generation, transmission and distribution, the fixed costs for capital amortization are covered as return on invested capital mandated by utility commissions or other rate setting entities. With the introduction of electric markets, independent power producers (IPPs) must cover fixed costs and profit from the difference between the price of electricity and the marginal cost to generate power. This creates a tension between the efficiency of a new generating unit and the cost to build it, as novel efficiency measures must pay for themselves as well as a risk premium. The book value of a power plant is first cost less accumulated amortization offset by improvements, but its market value may be for example determined as the net present value of discounted cash flows, which depends on the investors' return requirements and forecasts of the cash flows. The cash flow forecasts are influenced by the economic dispatch order, which may change based on fuel costs or if newer and more efficient units are constructed.

Because sunlight is free, solar power plants have very low marginal costs and are always at the front of the dispatch queue, and in some jurisdictions are mandated to be dispatched first. However solar power plants are relatively expensive to construct ($3 to $6 per watt, for example), and their low capacity factor (typically less than 25% of nameplate), requires a high price for electricity to cover the fixed costs and profit. As a matter of public policy, various countries and utility markets provide incentives to encourage construction of solar power plants, using mechanisms such as:

- renewable energy pricing policy such as feed-in tariffs (FITs) or power purchase agreements (PPAs) offering a guaranteed payment per kilowatt-hour;
- tax policy such as investment or production tax credits and accelerated depreciation;
- environmental policy such as carbon credits or taxes and renewable portfolio standards.

The most important of these has been pricing policy, because it is revenue that is most important in determining whether an investment in a new power plant will be profitable, and revenue certainty reduces the financial risk premium. Energy pricing policy has favored solar thermal power plant designs that resemble base load plants with high efficiency, and has dis-favored load following capability. Feed in tariffs may also favor smaller power plants with higher capacity factors obtained by thermal energy storage. As renewable power has become competitive, these incentives are being reduced or eliminated, and renewable power plants will be expected to consider regulatory, market, commodity, and technology risks, similar to conventional power plants Rankine Steam Cycles are commonly used to convert thermal to electric energy. Raising the steam temperature tends to increase the power conversion efficiency, permitting a smaller amount of heat (e.g., fossil or solar) to produce the same power. Regenerative feedwater heating also increases efficiency, but at the expense of reduced power output for the same steam flow. Raising the pressure tends to increase the specific work (per unit of steam flow), permitting more power for the same size power block. Above pressures of about 50 to 75 bar, depending on the superheated steam temperature, the expanding steam may begin to condense within the turbine, potentially damaging the turbine by erosion. Accordingly at higher pressures, some form of reheat is required to avoid harmful condensation in the low pressure stage of the turbine. These and other factors determine the most economical steam conditions and steam cycle for use in a thermal power plant.

Because solar fields are expensive, by conventional thinking it is desirable to increase the thermal to electric efficiency of the power block by increasing the temperature and adding regenerative feedwater heating. These steps result in the use of expensive and sometimes exotic materials, manufacturing, and construction measures. These steps tend to reduce the nameplate power output of the turbine-generator (per unit of steam flow), increase startup time, and reduce load following capability.

As more renewable generation is installed, load following becomes more important than base load power. Consequently there is an increasing need for generating units with resiliency and flexibility to follow load.

The "Duck Curve" illustrates the challenge of managing a green grid. As can be seen in FIG. 1, the California Independent System Operator (CAISO) Base Load is being reduced as solar power ramps up its generation during the daytime. As the installed base of PV generation increases over the years, the afternoon 'hump' disappears and becomes an increasingly large depression causing two giga-watt-scale problems:

overgeneration risk occurs because thermal generation resources must continue to operate to be available when the preferred renewable resources become unavailable, as the sun sets for example;

ramp need occurs as the evening load increase coincides with the decreasing output from solar power.

Ironically, the conventional modern solar thermal power plant is not well suited to this regime. Without thermal storage, such plants contribute to the 'Duck Curve' depression. By adding thermal energy storage, conventional solar thermal plants can address over-generation by operating during the evening peak rather than during the afternoon depression. But their base load approach to power block design means these plants are not well suited to load following and cannot materially address the steep ramps.

SUMMARY

This specification discloses solar hybrid power plants that utilize both solar energy and fossil fuels to generate electricity, and methods of operating those power plants, that may increase the solar energy fraction compared to conventional hybrid solar-fossil power plants to reduce the overall heat rate and carbon emissions, integrate solar thermal energy collection and storage with fast-start combustion turbines to provide dispatchable solar power with load following capability, and reduce the overall cost of solar thermal power.

This may be achieved by synergistic arrangements of technologies, which may include the following.

Integration of the solar derived steam into the combined cycle using the solar thermal energy primarily or exclusively for latent heat transfer (evaporation), while reserving the heat from the turbine exhaust gas primarily or exclusively for sensible heat transfer (feedwater heating and steam superheating). Here "primarily" means $\geq 50\%$, $\geq 60\%$, $\geq 70\%$, $\geq 80\%$, $\geq 90\%$, $\geq 95\%$, or $\geq 99\%$. Eliminating or reducing extraction steam and feedwater heaters reduces first cost and enhances the load following capability of the power plant.

Integration of the solar derived steam into the combined cycle using the solar thermal energy primarily or exclusively to produce a first stream of saturated or slightly superheated steam, parallel generation of a second stream of saturated or slightly superheated steam using heat primarily or exclusively from the turbine exhaust gas, and production of superheated steam from the combined first and second streams of saturated or slightly superheated steam using heat primarily or exclusively from the turbine exhaust gas stream.

Use of low vapor pressure heat transfer fluids (HTFs), which permit thermal energy to be stored in low cost atmospheric storage tanks. Suitable HTFs may include paraffinic heat transfer fluids such as Duratherm 630™, for example, which are less hazardous and less expensive than the HTFs used in conventional parabolic trough technology. The latter HTFs are also typically unsuitable for energy storage because their high vapor pressure would require very large and expensive pressure vessels.

Use of a low pressure (e.g., $\leq$ about 75 bar, $\leq$ about 70 bar, $\leq$ about 65 bar, $\leq$ about 60 bar, $\leq$ about 55 bar, or $\leq$ about 50 bar) Rankine steam cycle with live steam conditions of, for example, about 70 bar/470° C. or about 60 bar/550° C., for which the boiling point is suitable for the low vapor pressure HTF, and for which the combustion turbine-generator (CTG) exhaust gases are readily able to provide the necessary superheat. These steam conditions may also eliminate the need for reheat, because the turbine exhaust moisture content may remain within acceptable limits, and may provide further cost savings by permitting the use of a single casing turbine, rather than separate high and low pressure turbines.

These arrangements may overcome several technical limitations with conventional approaches to solar thermal power plants, such as for example the following.

The maximum capacity of a conventional stand-alone solar thermal collection system is generally greater than the capacity of the steam turbine generator. Coupling a conventional thermal energy storage system will generally improve the capacity factor of the solar thermal system, but may not improve the economic utility because of the expense of the storage system, and the reduced steam temperature when operating from stored energy.

In a typical conventional solar-fossil hybrid power plant, only about 5% of the gross electric power can be derived from solar thermal energy because flow and temperatures become sub-optimal when the solar steam is excessive. In contrast, solar hybrid power plants described in this specification may permit a 25% or larger fraction of electric power to be derived from the solar energy.

In a typical solar thermal plant employing parabolic trough technology, synthetic HTFs are required in order to deliver live superheated steam temperature of about 370° C. to achieve the needed Rankine cycle efficiency. In solar hybrid power plants described in this specification, more superheat may be obtained via the CTG exhaust gases, enabling higher efficiency. Further, the expense and environmental hazards of fluids such as Therminol® may be avoided.

Molten salt is typically used for thermal energy storage in a conventional solar thermal power plant because the synthetic HTF is too expensive to use for storage, and the vapor pressure of the HTF would require excessively large and expensive thick-walled pressure vessels. Molten salts require special and expensive materials, and expensive heat tracing to prevent freezing and obstructions in the molten salt piping. In addition, the salts require an additional heat exchanger which adds cost and reduces efficiency. By using low cost, non-toxic HIT with low vapor pressure, solar hybrid power plants described in this specification may avoid these difficulties.

In addition, solar hybrid power plants as disclosed in this specification may continue to operate as a combined cycle power plant when solar energy is not available or the energy storage is depleted. For example, heat exchanger coils in the flue gas of the combustion turbine generator may be arranged as a once-through steam generator to produce steam, either with supplementary firing (using fossil fuel) to maintain the design steam flow rate, or at lower flow rate and pressure. Alternatively or in addition, heat may be recovered from the exhaust of one or more separate simple cycle gas turbine peaking units or combined cycle power plants co-located with the solar hybrid power plant, to provide an additional source of energy to charge the thermal energy storage.

These and other embodiments, features and advantages of the present invention will become more apparent to those skilled in the art when taken with reference to the following more detailed description of the invention in conjunction with the accompanying drawings that are first briefly described.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used in this specification and the appended claims, the singular forms "a," "an," and "the" include plural referents unless the context clearly indicates otherwise.

This specification discloses dispatchable solar hybrid combined cycle power plants with energy storage, and methods for operating them. The hybrid aspect means that power may be derived from both solar and fossil energy sources. The combined cycle aspect means that power may be generated by both a Brayton topping cycle and a Rankine bottoming cycle. The dispatchable aspect means that thermal energy may be stored in order to produce power when the sun is not available.

Figure 1:
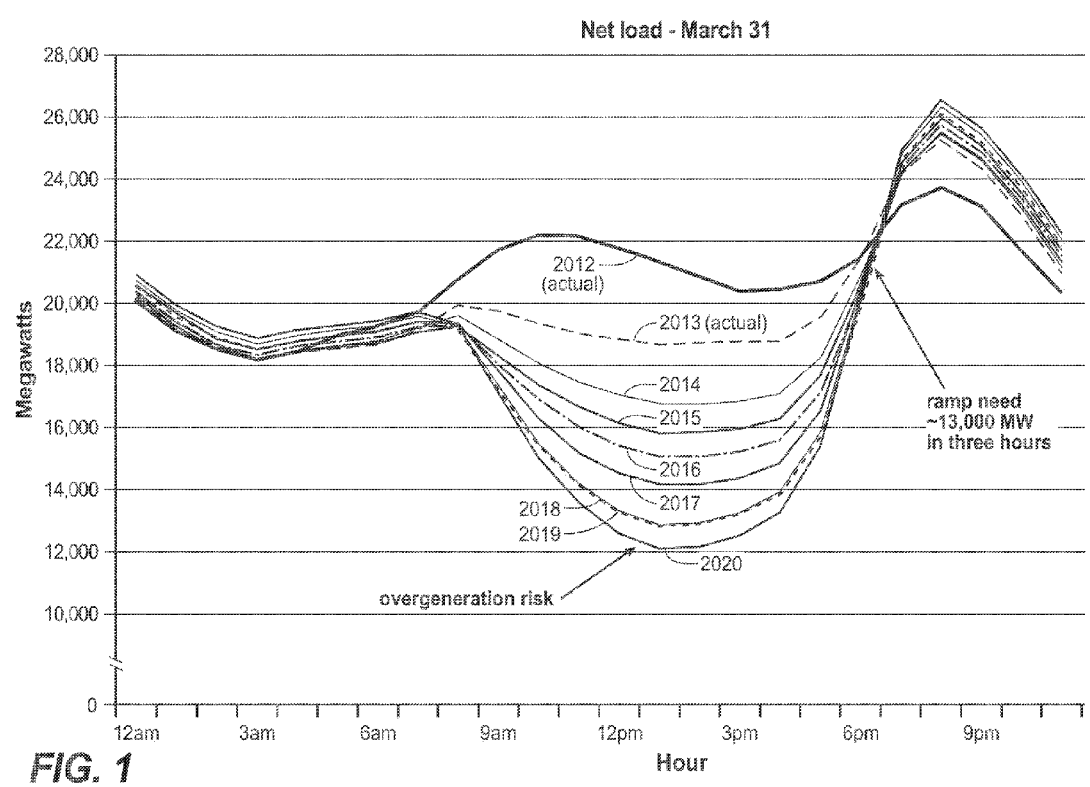
FIG. 1 shows plots of the California Independent System Operator Base Load as a function of time of day for Mar. 31, 2012 and 2013 (actual base load), and for Mar. 31, 2014-2020 (projected base load).
Figure 2:
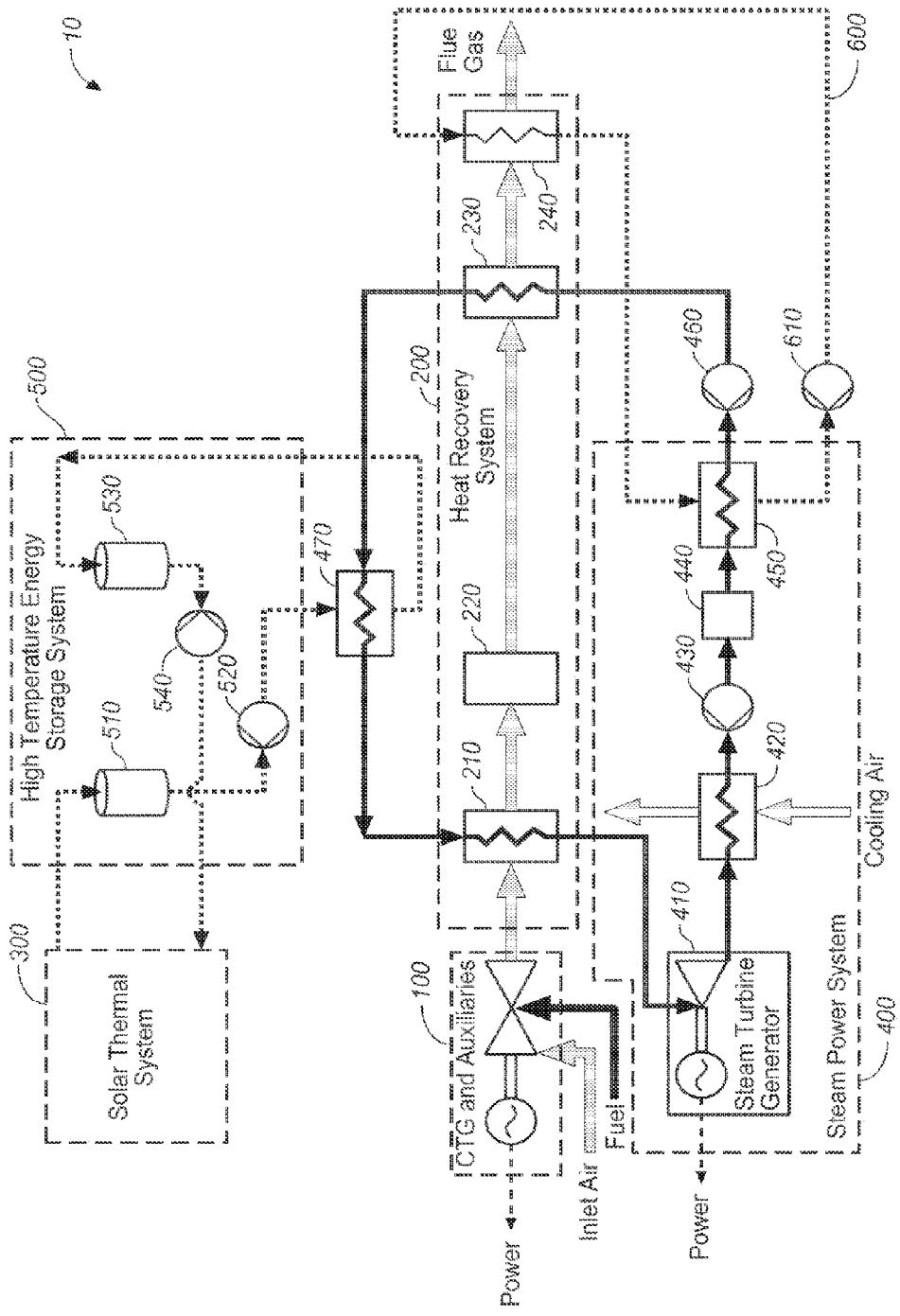
FIG. 2 schematically illustrates an example solar hybrid power plant.

FIG. 2 schematically illustrates an example solar hybrid power plant 10 comprising a combustion turbine generator 100, a heat recovery system 200, a solar thermal system 300, a steam power system 400, and a thermal energy storage system 500. As described in more detail below, heat from the combustion turbine generator exhaust gas collected in heat recovery system 200 and heat collected in solar thermal system 300 may be used separately or in combination to drive steam power system 400. Heat from solar thermal system 300, and optionally heat from other sources, may be stored in thermal energy storage system 500 for later dispatch to steam power system 400. Operation of solar hybrid power plant 10 is described below with reference to particular example temperatures, pressures, and flow rates. Any other suitable values for these parameters may also be used.

Referring again to FIG. 2, combustion turbine generator 100 may be a conventional combustion turbine generator operating on an open Brayton cycle in which atmospheric air is compressed and mixed with fossil fuel which is burned to produce hot gas that expands across a turbine. The compressor, turbine, and generator may be aligned along a rotating shaft, optionally with an intermediate gearbox to match the shaft speeds. Auxiliaries to the combustion turbine generator may include, for example, inlet air filtering and cooling systems, lubrication systems, control and condition monitoring systems, and ventilation and fire suppression equipment. The combustion turbine generator may be, for example, a Siemens SGT6-8000H, which is a modern 60 Hertz system with a gross rating of 274 Megawatts at 40% efficiency. Any other suitable combustion turbine generator may be used instead. Combustion turbine 100 may exhaust, for example, about 604 Kg/s of flue gas at about 617° C.

Exhaust gas from combustion turbine generator 100 is directed into heat recovery system 200, which extracts heat from the exhaust gas for use by the steam power system 400. Heat recovery system 200 includes heat recovery units (heat exchangers) disposed in the duct work connecting the combustion turbine generator with the chimney/stack of the power plant. The heat recovery units typically transfer heat from the exhaust gas to a fluid flowing through a coil.

Exhaust gas from the combustion turbine generator first flows through high temperature heat recovery unit (HTHRU) 210, which functions as a super heater to increase the temperature of steam generated in boiler 470 (further described below) while cooling the exhaust gas to, for example, about 405° C. The exhaust gas may then optionally flow through a selective catalytic reduction (SCR) 220 system to reduce emissions of nitrogen oxides. After the optional SCR 220, the exhaust gas flows through medium temperature heat recovery unit (MTHRU) 230, which functions as an economizer to warm feedwater for boiler 470 while further cooling the exhaust gas to, for example about 160° C. The exhaust gas then flows through low temperature heat recovery unit (LTHRU) 240, which captures heat used to preheat the boiler feedwater prior to passage of the boiler feedwater through MTHRU 230 and further cools the exhaust gas to, for example, about 60° C. The exhaust gas is then discharged up the stack/chimney.

Solar thermal system 300 concentrates sunlight onto a heat collector through which a heat transfer fluid flows to receive energy in the form of sensible or latent heat. Solar thermal system 300 may be or comprise, for example, a linear focus system using parabolic trough or compact linear Fresnel reflector technology, or may be a dish or tower type concentrating solar thermal energy collector. Solar thermal system 300 may employ, for example, Solar Reserve Inc. molten salt tower solar energy collectors, Bright Source, Inc. direct steam tower solar energy collectors, AREVA Solar Inc. CLFR solar steam generators, or conventional parabolic trough heat collector elements. Any suitable solar thermal energy collectors may be used in solar thermal system 300. Intermediate heat transfer fluid storage tanks and pumps (not shown) may be arranged within solar thermal system 300 to facilitate operations and maintenance.

Thermal energy storage system 500 stores thermal energy as sensible heat in a low vapor pressure liquid heat transfer fluid. As used herein the term "low vapor pressure liquid heat transfer fluid" refers to a heat transfer fluid having a vapor pressure less than about 0.1 atmosphere, or less than about 0.5 atmosphere, or less than about 1.0 atmosphere, at a temperature of about 300° C., or about 330° C., or about 350° C. Hot heat transfer fluid stored in thermal energy storage system 500 may be used when needed to provide heat to steam power system 400 (e.g., to boiler 470).

The use of low vapor pressure heat transfer fluid in thermal energy storage system 500 permits the hot liquid to be stored in thin-wall insulated tanks at about atmospheric pressure. In contrast, conventional parabolic trough based solar thermal systems typically use fluids such as Therminol®, which are not suitable for thermal energy storage because their vapor pressure would require the use of pressure vessels, which are impractical for the large volumes that may be desired.

As noted above in the summary section, one heat transfer fluid suitable for use in thermal energy storage system 500 is the paraffinic heat transfer fluid Duratherm 630™, which is both less toxic and lower cost than the commonly used solar thermal fluids such as Therminol®. Duratherm 630™ has a vapor pressure of about 0.1 atmospheres at about 316° C. Other heat transfer fluids with low vapor pressure may also be used, including other paraffinic heat transfer fluids and molten salts, subject to technical and economic considerations related to heat transfer fluid cost, the cost of compatible piping, tanks, valves and pumps, environmental and fire hazards, the cost of heat tracing for low temperature operation, the stability of the heat transfer fluid at high temperature, and the quantity of fluid required, based on the density and specific heat.

Sensible heat may be added directly to the low vapor pressure heat transfer fluid in thermal energy storage system 500 by solar thermal system 300 by pumping cold heat transfer fluid through solar thermal system 300. A control system may regulate the flow rate of the heat transfer fluid through the solar thermal system to achieve a desired temperature.

Alternatively, or in addition, sensible heat may be added indirectly to the low vapor pressure heat transfer fluid in thermal energy storage system 500 by solar thermal system 300 by pumping cold heat transfer fluid through a heat exchanger to receive heat from a higher temperature fluid circulated through solar thermal system 300. This may involve, for example, sensible heat transfer from a high vapor pressure heat transfer fluid (such as Therminol®) heated to about 400° C. in a conventional parabolic trough solar energy collector, or sensible heat transfer from a molten salt in the case of tower or novel linear technologies. Alternatively, this could involve latent heat transfer from steam condensation. For example, solar steam condensing at about 132 bar would heat the low-vapor pressure heat transfer fluid to about 332° C., which is the maximum operating temperature of Duratherm 630®.

Such indirect heating may reduce technology risk by using proven commercial technology and may also be a cost effective means of upgrading an existing solar thermal power plant to a dispatchable hybrid plant.

Sensible heat may also be added to the heat transfer fluid in thermal energy storage system 500 by non-solar sources. Non-solar heating may involve pumping the low vapor pressure heat transfer fluid through a heater or heat exchanger, for which the source of energy may be or include, for example, hot combustion exhaust gases from combustion turbine generator 100, or hot combustion gases from another gas turbine co-located with solar hybrid power plant 10. For example, a second combustion turbine generator could be provided for peaking service. Instead of utilizing a heat recovery steam generator, the exhaust gas from the second combustion turbine generator could flow across heat exchangers to transfer heat from the hot exhaust gas to a low vapor pressure heat transfer fluid which may then be stored in tanks. This arrangement could supplement the energy stored by a solar collection system, or could be employed instead of a solar collection system. The latter case is similar to a two-on-one combined cycle plant, where two combustion turbine generators and heat recovery steam generators feed a single steam power cycle, but provides for time shifting of the power generation in the bottoming cycle. The low vapor pressure heat transfer fluid could be heated directly in the exhaust stream or indirectly by, for example, condensing steam produced by a heat recovery steam generator.

Alternatively, non-solar heating may use for example a fossil fuel burner, process heat, or electric heating. In the latter case the electric heating of the low vapor pressure heat transfer fluid may store electricity generated at remote locations at inopportune or uneconomic times, with discharge at more favorable times.

Hot and cold low vapor pressure heat transfer fluid in thermal energy storage system 500 may be stored for example in dedicated hot and cold tanks (as illustrated), in one or more thermocline tanks in which hot heat transfer fluid is stored above cold heat transfer fluid in the same tank, or in tanks that may be used alternatively for hot or cold storage. The latter two approaches may be suitable if the sensible heating and cooling of the tank and associated piping is inconsequential compared to the economic savings achieved by reducing the number of tanks required. Filling, draining, and ullage of tanks and tank farms may follow conventional practice.

The hot and cold low vapor pressure heat transfer fluid in thermal energy storage system 500 is typically stored at about atmospheric pressure. Thermal energy storage system 500 typically operates between about 330° C. (hot heat transfer fluid) and about 250° C. (cold heat transfer fluid). Any other suitable temperature range may also be used.

Referring again to the example of FIG. 2, when heat is available from solar thermal system 300 a pump 540 may draw cold heat transfer fluid at a temperature of, for example, about 265° C. from low temperature storage tank 530, pump it through solar thermal system 300 for heating and then to high temperature storage tank 510, where it is stored at a temperature of, for example, about 330° C. Pump 520 may pump hot heat transfer fluid from high temperature storage tank 510 through boiler 470 to heat boiler feedwater to generate steam, and then back to low temperature storage tank 530. Alternatively, or in addition, heat transfer fluid may be pumped from boiler 470, through solar thermal system 300 for heating, and then back to the boiler to generate steam. That is, one or both of the heat transfer fluid storage tanks may optionally be bypassed. Hot heat transfer fluid may be supplied to boiler 470 in various proportions as desired from hot storage tank 510 or directly from solar thermal system 300.

In steam power system 400, superheated steam (generated as described below) is delivered to steam turbine generator 410, for example at design conditions of about 70 bar/470° C. and a flow rate of about 250 kg/s. This design condition allows use of a compact single-casing turbine without reheat, because the expanded steam will not have excessive moisture (liquid content) in the last stage of the turbine. Reheating of the steam may be avoided to save cost, and elimination or reduction of extraction steam for feedwater heating enhances load following and permits all of the steam to perform useful work.

After expanding through the turbine, steam is condensed to liquid water, typically using an air-cooled condenser 420 at an annual average condensing temperature of, for example, about 40° C., which corresponds to an exhaust pressure of about 0.085 bar. Under these conditions, a steam flow of about 250 kg/s may generate approximately 225 Megawatts of electric power.

Condensing temperature varies depending on the cooling capacity, with lower condensing temperature permitting higher net power generation. Water cooling, if available, would increase the net power generation by reducing the condensing pressure, and eliminate or reduce power consumed by the fans of the air cooled condenser.

Heat derived from the combustion turbine generator exhaust gases using low temperature heat recovery unit 240 described above is used to raise the condensate temperature from about 40° C. to about 105° C., for example. At an example water (steam) flow rate of about 250 kg/s this may require, for example, about 65 MW of heating. The condensate may be either directly heated by circulating it through low temperature heat recovery unit 240 or indirectly heated.

In the illustrated example, a condensate pump 430 transfers the condensed water from condenser 420 through an optional condensate polishing unit 440 and into a feedwater heater 450. The condensate is then indirectly heated with a low temperature heat transfer loop 600 that circulates a heat transfer fluid through low temperature heat recovery unit 240 to collect heat and delivers the collected heat to feedwater heater 450. Feedwater heater 450 may be for example a closed feedwater heater. Alternatively, feedwater heater 450 may be an open dearating feedwater heater and the heat transfer fluid in loop 600 may be used to produce low pressure pegging steam delivered to the feedwater heater. Pegging steam may in addition or alternatively be drawn from any other suitable location in steam power system 400.

Indirect feedwater heating as just described may provide operational flexibility to overcome transient mismatches between the heat available in the combustion turbine generator exhaust gas and the heat required for feedwater heating, particularly during startup and load following. For example, optional intermediate storage tanks in low temperature heat transfer loop 600 may hold heat transfer fluid to manage such transient mismatches between the availability of heat in the exhaust gas and the need for feedwater heating.

Referring once more to the example of FIG. 2, boiler feedwater pump 460 supplies water from feedwater heater 450 to medium temperature heat recovery unit 230 at a pressure of about 75 bar, for example. Medium temperature heat recovery unit 230 raises the temperature of the feedwater from about 105° C. to about 255° C., for example, by heat transfer from the combustion turbine generator exhaust gas.

The heated water then enters boiler 470, which evaporates it to produce saturated steam at a temperature of about 288° C. and a pressure of about 70 bar, for example. At a water (steam) flow rate of about 250 kg/s this may require, for example, about 425 MW of heating provided from solar thermal system 300, from thermal energy storage system 500, or from a combination of solar thermal system 300 and thermal energy storage system 500. This would require about 2350 kg/s of heat transfer fluid if Duratherm 630™ were used to supply heat to boiler 470 at an input heat transfer fluid temperature of about 330° C. and an output heat transfer fluid temperature of about 265° C.

Boiler 470 may utilize for example a once-through arrangement to facilitate rapid startup and load following, but a recirculating drum-type boiler may also be used. Boiler 470 may optionally superheat the steam slightly, to about 290° C. for example.

The steam generated in boiler 470 flows to high temperature heat recovery unit 210, where the steam is further superheated to a temperature of, for example, about 470° C. This superheated steam is expanded across steam turbine generator 410 to generate power, and then condensed as described above.

As just described, solar hybrid power plant 10 may operate as a combined cycle power plant generating electric power with combustion turbine generator 100 and additional electric power with steam turbine generator 410. The combustion turbine generator power output is determined primarily by the fuel flow, and may be rated for example at about 275 MW. The steam turbine generator power output is determined primarily by the steam flow.

When there is energy available from thermal energy storage system 500 and/or solar thermal system 300 to heat boiler 470, the combustion turbine generator exhaust gas may be used primarily for single phase heat transfer to warm water before it enters boiler 470, and to superheat steam produced in boiler 470, as described above. Under these circumstances steam flow to boiler 470 may be about 250 kg/s at conditions of about 70 bar/470° C., for example, and the steam turbine generator electric power output may be about 225 MW. With a 275 MW combustion turbine generator the overall plant may then produce about 500 MW of electric power, for example.

Power plant 10 may also be operated as a combined cycle power plant without using the thermal energy storage system, by bypassing boiler 470 and for example using medium temperature heat recovery unit 230 and high temperature heat recovery unit 210 in series as a once through steam generator. In such cases the steam flow to the steam turbine generator will be reduced, for example from about 225 kg/s with boiler 470 to about 100 kg/s without boiler 470. With the lower flow rate but the same steam turbine throttle temperature of about 470° C., the steam turbine inlet pressure is reduced from about 70 bar to about 30 bar and the electric power output is reduced from about 225 MW to about 80 MW, so with a 275 MW combustion turbine generator the overall plant produces about 355 MW of electric power, for example.

Power plant 10 may also be operated as a combined cycle power plant at intermediate steam turbine generator operating conditions, with some steam produced by boiler 470.

Power plant 10 may also be operated as a simple cycle power plant, by not flowing water into heat recovery system 200, which is acceptable for some once through boiler designs, or by bypassing the combustion turbine generator exhaust gas around heat recovery system 200. In this case, the power plant produces electric power with the combustion turbine generator but not with the steam turbine generator. The overall power may then be, for example, about 275 MW.

It is important to note that fuel consumption is unchanged in the several operating modes just described, so the cost of power ($/MW-hour) and the heat rate (BTU/kw-hr) increase as the power output decreases.

Figure 3:
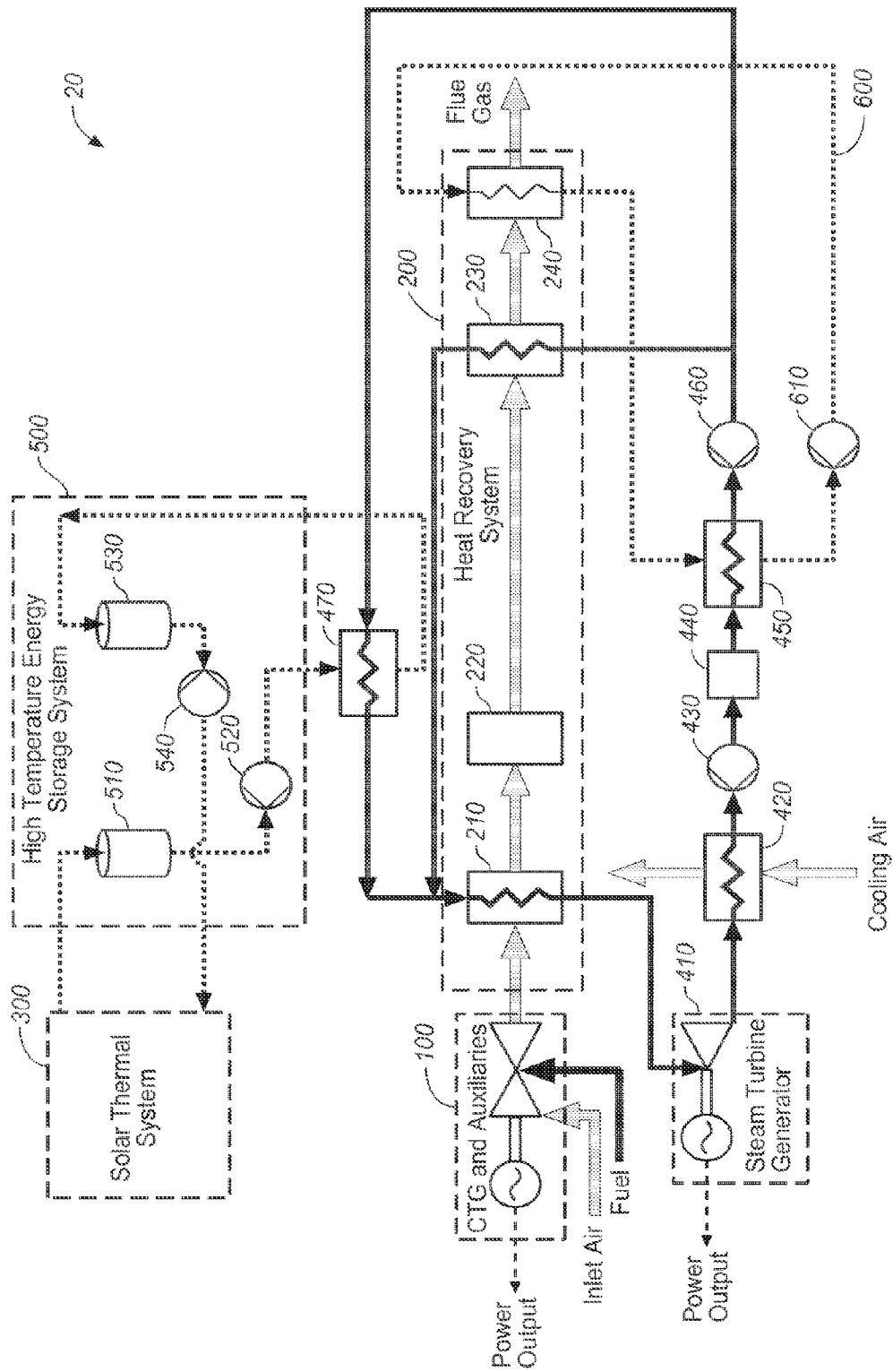
FIG. 3 schematically illustrates another example solar hybrid power plant.

In an alternative embodiment shown in FIG. 3 and referred to as Power Plant 20, the feedwater from pump 460 is split into two streams, one of which flows to MTHRU 230 and the other of which flows to Boiler 470. Both streams are boiled, one using heat from the exhaust gas and the other using heat stored in the low vapor pressure heat transfer fluid. In this embodiment, MTHRU 230 and boiler 470 are arranged in parallel in the steam circuit, and MTHRU 230 produces steam at about the same temperature and pressure as that produced in boiler 470, that is, saturated or slightly superheated steam. Steam from Boiler 470 is mixed with steam from MTHRU 230 and enters HTHRU 210, where the mixed steam is superheated before entering Steam Turbine 410.

In this embodiment heating duty is displaced from MTHRU 230 to boiler 470. By shifting the heating duty in this manner, more of the energy stored in the low vapor pressure heat transfer fluid can be extracted because the heat transfer fluid can be cooled to a lower temperature, potentially reducing the volume of heat transfer fluid to be stored in tanks. In addition, shifting heating duty to boiler 470 can reduce the average temperature of heat transfer fluid circulating in the solar field and consequently reduce heat losses.

This embodiment may simplify the design and operation of MTHU 230, because it always includes an evaporating section, whether or not energy is available from the energy storage system.

This embodiment may also permit additional thermal energy to be extracted from the low vapor pressure heat transfer fluid during sliding pressure operation. Without steam production from the heat transfer fluid, the steam turbine inlet pressure is reduced to achieve approximately constant volumetric flow through the turbine. At reduced turbine throttle pressure, the saturation temperature of steam is also reduced, for example to about 234 C at about 30 bar. After extracting heat to evaporate steam during full pressure operation, the heat transfer fluid temperature would be sufficient to boil additional steam during part load operation.

Tables 1A-1G provide example flow rates, pressures, temperatures, and other parameter values for operation of the example solar hybrid power plant 20 described above. Any other suitable values for these parameters may also be used.

Optimal operation of solar hybrid power plant 10 and 20 depends on performance parameters (for example, storage capacity, solar field capacity, combustion turbine generator capacity) which must be established during design, as well as parameters that are variable during the operation of the power plant. In addition, the solar resource forecast, instantaneous resource quantity, the available storage capacity, and the power capacity commitment and/or merchant power price and fuel cost are factors affecting the optimal use of the overall power plant. Moreover, assumptions about these latter factors may influence the selection of the performance design parameters.

For explanation, consider how certain parameters and factors would affect the optimal operation of the power plant operating on a grid subject to the 'Duck Curve.' Suppose the configuration of the power plant described above with operating parameters listed in Table 1, with four full-power hours of thermal storage (1700 MW-hour). On a particular day, eight full power hours of solar thermal resource (4250 MW-hour) may be forecast. During the mid-day period, when the highest solar resource is available, and the 'Duck Curve' overgeneration risk is highest, it may be desirable to reduce generation and divert solar thermal energy to storage. But around solar noon, the solar thermal system might have a capacity of 600 MW, meaning that the storage would be fully re-charged within 3 hours.

In anticipation of the need for storing energy in the thermal energy storage system, the optimal operating plan may attempt to fully deplete the energy storage during the morning, and then split hot heat transfer fluid between the boiler and storage, with the intention that storage becomes full just as the solar resource could no longer supply the full boiler capacity. Given that the solar resource is different each day of the year, this is a challenge to achieve, once a fixed amount of storage has been selected. Accordingly, the design parameters may be optimized to maximize the value of the storage and solar thermal systems over the life of the power plant. Once a design point has been selected, the operating strategy may then be optimized to achieve the maximum revenue, given the fuel and electricity tariffs, which may vary by time of day.

Combustion turbine generators have the capability of burning a variety of fuels in addition to natural gas. In the event an emergency interrupts the supply of fuel gas, heat transfer fluid could be burned in the combustion turbine generator to maintain power generation. Although such an unexpected event (triggered for example by a natural disaster such as an earthquake) might never occur, the solar power plants described in this specification may readily facilitate emergency operation, upon provision of suitable fuel oil piping, nozzles, atomizers, etc.

This disclosure is illustrative and not limiting. Further modifications will be apparent to one skilled in the art in light of this disclosure and are intended to fall within the scope of the appended claims.

TABLE 1A

Gas flows through CTG 100 and DRS 200

| | Pressure (bar) | Temperature (° C.) | Flow (kg/s) | | | | | | |
|---|---|---|---|---|---|---|---|---|---|
| | | | Total | O2 | N2 | H2O | CH4 | CO2 | Other gases |
| Fuel to CTG 100 | 28.000 | 335.477 | 14.0 | 0.0 | 0.3719 | 0.0 | 12.7 | 0.26 | balance |
| Inlet air to CTG 100 | 1.000 | 15.0 | 590.0 | 136.5 | 445.6 | 0.0 | 0.0 | 0.3 | balance |
| CTG 100 Exhaust | 1.002 | 615.1 | 604.0 | 83.4 | 445.9 | 29.7 | 0.0 | 37.4 | balance |
| HTHRU 210 Exhaust | 1.001 | 346.7 | 604.0 | 83.4 | 445.9 | 29.7 | 0.0 | 37.4 | balance |
| MTHRU 230 Exhaust | 1.001 | 169.0 | 604.0 | 83.4 | 445.9 | 29.7 | 0.0 | 37.4 | balance |
| LTHRU 240 Exhaust | 1.000 | 66.5 | 604.0 | 83.4 | 445.9 | 29.7 | 0.0 | 37.4 | balance |

TABLE 1B

Steam and Water Flows

| | Pressure (bar) | Temperature (° C.) | Flow rate (kg/s) | Enthalpy (kJ/kg) |
|---|---|---|---|---|
| Superheated Steam from HTHRU 210 | 61.5 | 548.0 | 250 | 3535.0 |
| Exhaust From STG 410 | 0.085 | 42.7 | 250 | 2534.6 |
| Condensate from ACC 420 | 0.085 | 40.0 | 250 | 167.5 |
| Condensate from Transfer Pump 430 | 2.21 | 40.1 | 250 | 168.2 |
| Condensate from Deaerator 450 | 2.21 | 104.9 | 250 | 439.6 |
| Feedwater from Pump 460 | 62.2 | 105.8 | 250 | 448.0 |
| Steam from MTHRU 230 | 62.2 | 280.0 | 50 | 2792.1 |
| Steam From Boiler 470 | 62.2 | 280.0 | 200 | 2792.1 |

TABLE 1C

HTF flows between Storage System 500 and Boiler 470

| | Pressure (bar) | Temperature (° C.) | Flow rate (kg/s) |
|---|---|---|---|
| HTF from Hot Tank 510 | 1 | 332 | 2358 |
| HTF from Pump 520 to boiler 470 | 10 | 332 | 2358 |
| HTF from boiler 470 to Cold Tank 530 | 3 | 261 | 2358 |

TABLE 1D

HTF flows between LTHRU 240 and Deaerator 450

| | Pressure (bar) | Temperature (° C.) | Flow rate (kg/s) |
|---|---|---|---|
| HTF from LTHRU 240 | 5 | 140 | 581 |
| HTF from Pump 520 to boiler 470 | 10 | 140 | 581 |
| HTF from boiler 470 to Cold Tank 530 | 3 | 90 | 581 |

TABLE 1E

Air Flow through Air Cooled Condenser 420

| Stream | Pressure (bar) | Temperature (° C.) | Flow rate (kg/s) | Enthalpy (kJ/kg) |
|---|---|---|---|---|
| Cooling Air IN | 1.00 | 15.0 | 30000.00 | 15.30 |
| Cold Air to ACC | 1.00 | 15.0 | 30000.00 | 15.33 |
| Hot Air from ACC | 1.00 | 34.5 | 30000.00 | 35.05 |

TABLE 1F

Heating Duties

| | Power |
|---|---|
| Heat Release Rate in Combustor of CTG 100 (HHV) | 739.5 |
| HTHRU 210 | 185.1 |
| Boiler 470 | 469.0 |
| MTHRU 230 | 117.2 |
| LTHRU 240 | 67.9 |
| ACC 420 | 591.8 |
| Deaerator 450 | 67.9 |

TABLE 1G

Electric Generation and Efficiency

| Component | Power |
|---|---|
| CTG 100 Power Output | 273.5 |
| STG 410 Power Output | 250.1 |
| Gross Power Output (CTG 100 plus STG 410) | 523.6 |
| Fuel Consumption | 739.5 |
| Gross Efficiency | 70.8% |
| Principal Parasitic Loads | |
| Fuel Gas Compressor (not shown) | 11.7 |
| Air Cooled Condenser 420 | 1.0 |
| Boiler Feedwater Pump 460 | 2.0 |
| HTF Circulating Pump 520 | 4.5 |
| HTF Circulating Pump 610 | 0.5 |
| Other House Loads | 1 |
| Net Generation | 502.9 |
| Net Efficiency | 68.0% |

What is claimed is:

1. A combined cycle electric power plant comprising:
a combustion turbine generator that combusts fuel to generate electricity and produce hot exhaust gases;
a second heat source other than the combustion turbine;
a thermal energy storage system that stores heat transferred from the second heat source;
a steam turbine generator that expands superheated steam across a steam turbine to generate electricity;
a first boiler; and
a superheater;
wherein the combined cycle electric power plant has a first mode of operation in which the superheated steam is produced by heating condensate from the steam turbine generator primarily with heat from the combustion turbine exhaust gases to produce hot liquid feedwater, boiling the hot liquid feedwater in the first boiler with heat primarily from the second heat source, from the thermal energy storage system, or from the second heat source and the thermal energy storage system to produce steam, and superheating the steam in the superheater primarily with additional heat from the combustion turbine exhaust gases.

2. The combined cycle electric power plant of claim 1, wherein in the first mode of operation the superheated steam is produced by heating condensate from the steam turbine generator exclusively with heat from the combustion turbine exhaust gases to produce hot liquid feedwater, boiling the hot liquid feedwater in the first boiler with heat exclusively from the second heat source, from the thermal energy storage system, or from the second heat source and the thermal energy storage system to produce steam, and superheating the steam in the superheater exclusively with additional heat from the combustion turbine exhaust gases.

3. The combined cycle electric power plant of claim 1, having a second mode of operation wherein the superheated steam is produced using heat exclusively from the combustion turbine exhaust gases.

4. The combined cycle electric power plant of claim 1, wherein the thermal energy storage system stores heat in a low vapor pressure heat transfer fluid at a pressure of about one atmosphere and a temperature greater than or equal to about 300° C.

5. The combined cycle electric power plant of claim 4, wherein the thermal energy storage system provides heat to boil the hot liquid feedwater by heat exchange between the low vapor pressure heat transfer fluid and the hot liquid feedwater.

6. The combined cycle electric power plant of claim 1, wherein the superheated steam has a pressure of about 70 bar and a temperature of about 470° C. at an inlet to the steam turbine.

7. The combined cycle electric power plant of claim 1, wherein the second heat source is or comprises a solar thermal system that concentrates solar radiation to collect solar energy as heat.

8. The combined cycle electric power plant of claim 1, wherein the second heat source is or comprises another combustion turbine generator.

9. The combined cycle electric power plant of claim 1, wherein the second heat source is or comprises an electrically powered heater.

10. The combined cycle electric power plant of claim 1, wherein:
in the first mode of operation the superheated steam is produced by heating condensate from the steam turbine generator exclusively with heat from the combustion turbine exhaust gases to produce hot liquid feedwater, boiling the hot liquid feedwater in the first boiler with heat exclusively from the second heat source, from the thermal energy storage system, or from the second heat source and the thermal energy storage system to produce steam, and superheating the steam in the superheater exclusively with additional heat from the combustion turbine exhaust gases;

the thermal energy storage system stores heat in a low vapor pressure heat transfer fluid at a pressure of about one atmosphere and a temperature greater than or equal to about 300° C.;

the thermal energy storage system provides heat to boil the hot liquid feedwater by heat exchange between the low vapor pressure heat transfer fluid and the hot liquid feedwater; and the superheated steam has a pressure of about 70 bar and a temperature of about 470° C. at an inlet to the steam turbine.

11. The combined cycle electric power plant of claim 1 comprising a second boiler;

wherein in the first mode of operation additional condensate from the steam turbine generator is heated exclusively with heat from the combustion turbine exhaust gases to produce additional hot liquid feedwater, the additional hot liquid feedwater is boiled in the second boiler with heat exclusively from the combustion turbine exhaust gases to produce additional steam, and the superheated steam is produced in the superheater by heating a mixture of steam from the first boiler and the additional steam from the second boiler with heat exclusively from the combustion turbine exhaust gases.

12. The combined cycle electric power plant of claim 11, having a second mode of operation wherein the superheated steam is produced in the superheater by heating steam exclusively from the second boiler with heat exclusively from the combustion turbine exhaust gases.

13. The combined cycle electric power plant of claim 11, wherein the superheated steam has a pressure of about 60 bar and a temperature of about 550° C. at an inlet to the steam turbine generator.

14. The combined cycle electric power plant of claim 11, wherein the second heat source is or comprises a solar thermal system that concentrates solar radiation to collect solar energy as heat.

15. The combined cycle electric power plant of claim 11, wherein the second heat source is or comprises another combustion turbine generator.

16. The combined cycle electric power plant of claim 11, wherein the second heat source is or comprises an electrically powered heater.

17. The combined cycle electric power plant of claim 11, comprising a feedwater heater that heats liquid condensate from the steam turbine generator with heat from the combustion turbine exhaust gases and provides a first stream of the heated liquid condensate to the first boiler and a second stream of the heated liquid condensate to the second boiler.

18. The combined cycle electric power plant of claim 17, wherein the mass flow rate of the second stream of heated liquid condensate is about four times the mass flow rate of the first stream of heated liquid condensate.

* * * * *